(12) United States Patent
Ksondzyk et al.

(10) Patent No.: US 8,773,396 B1
(45) Date of Patent: Jul. 8, 2014

(54) DETECTING TOUCHDOWNS AND LIFTOFFS OF TOUCH OBJECTS

(71) Applicants: Petro Ksondzyk, Seattle, WA (US); Michael Patrick Hills, Lynnwood, WA (US); Chang Kyoung Kim, Gyeonggi-do (KR)

(72) Inventors: Petro Ksondzyk, Seattle, WA (US); Michael Patrick Hills, Lynnwood, WA (US); Chang Kyoung Kim, Gyeonggi-do (KR)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 13/918,756

(22) Filed: Jun. 14, 2013

Related U.S. Application Data

(60) Provisional application No. 61/774,336, filed on Mar. 7, 2013.

(51) Int. Cl.
*G06F 3/044* (2006.01)
(52) U.S. Cl.
CPC ..................................... *G06F 3/044* (2013.01)
USPC ........................................................ 345/174
(58) Field of Classification Search
None
See application file for complete search history.

(56) References Cited

U.S. PATENT DOCUMENTS

| 8,184,102 | B2 * | 5/2012 | Park et al. ...................... 345/173 |
| 8,334,849 | B2 * | 12/2012 | Murphy et al. ................ 345/174 |
| 8,384,675 | B2 | 2/2013 | Westerman et al. |
| 8,487,912 | B1 * | 7/2013 | Peterson ........................ 345/175 |
| 2009/0284495 | A1 | 11/2009 | Geaghan et al. |
| 2009/0303187 | A1 | 12/2009 | Pallakoff |
| 2013/0016129 | A1 | 1/2013 | Gossweiler III et al. |
| 2013/0076688 | A1 * | 3/2013 | Tokutake ....................... 345/174 |
| 2013/0141388 | A1 * | 6/2013 | Ludwig et al. ................. 345/174 |

FOREIGN PATENT DOCUMENTS

| EP | 2211256 A | 7/2010 |
| EP | 2450783 A | 5/2012 |
| EP | 2457147 A | 5/2012 |

OTHER PUBLICATIONS

Boring, Sebastian, "The Fat Thumb: Using the Thumb's Contact Size for Single-Handed Mobile Interaction," MobileHCI'12, Sep. 21-24, 2012; 10 pages.
Fernquist, Jennifer, ""Oh Snap"—Helping Users Align Digital Objects on Touch Interfaces," INTERACT'11 Proceedings of the 13th IFIP TC 13 international conference on Human-computer interaction—vol. Part III, Sep. 5, 2011, pp. 338-355; 18 pages.
Zaliva, Vadim, "3D Finger Posture Detection and Gesture Recognition on Touch Surfaces," 12th International Conference on Control Automation Robotics & Vision (ICARCV), Dec. 5-7, 2012, pp. 359-364; 6 pages.

* cited by examiner

*Primary Examiner* — Jason Olson

(57) ABSTRACT

A system comprises a processing device and a capacitive sense array that includes a plurality of electrodes is disclosed. When a touchdown of a touch object is detected, the change in a touch area (e.g., an area where the touch object is in contact with the touch panel) caused by the touchdown may not be reported as a movement of the touch object. When a liftoff of the touch object is detected, the change in the touch area caused by the liftoff may not be reported as a movement of the touch object.

20 Claims, 8 Drawing Sheets

US 8,773,396 B1

DETECTING TOUCHDOWNS AND LIFTOFFS OF TOUCH OBJECTS

RELATED APPLICATIONS

This application claims the benefit of U.S. Provisional Application No. 61/774,336 filed on Mar. 7, 2013, the contents of which are hereby incorporated by reference.

TECHNICAL FIELD

The present disclosure relates generally to sensing systems or devices, and more particularly to capacitance sensing systems or devices.

BACKGROUND

Capacitance sensing systems can sense electrical signals generated on electrodes that reflect changes in capacitance. Such changes in capacitance can indicate a touch event (i.e., the proximity of an object to particular electrodes or the presence of the object proximate a touch screen). Capacitive sense elements may be used to replace mechanical buttons, knobs and other similar mechanical user interface controls. The use of a capacitive sense element allows for the elimination of complicated mechanical switches and buttons, providing reliable operation under harsh conditions. In addition, capacitive sense elements are widely used in modern customer applications, providing new user interface options in existing products. Capacitive sense elements can range from a single button to a large number arranged in the form of a capacitive sense array for a touch-sensing surface.

Transparent touch screens that utilize capacitive sense arrays are ubiquitous in today's industrial and consumer markets. They can be found on cellular phones, GPS devices, set-top boxes, cameras, computer screens, MP3 players, digital tablets, and the like. The capacitive sense arrays work by measuring the capacitance of a capacitive sense element, and looking for a delta in capacitance indicating a touch or presence of a conductive object. When a conductive object (e.g., a finger, hand, or other object) comes into contact or close proximity with a capacitive sense element, the capacitance changes and the conductive object is detected. The capacitance changes of the capacitive touch sense elements can be measured by an electrical circuit. The electrical circuit converts the measured capacitances of the capacitive sense elements into digital values.

There are two typical types of capacitance: 1) mutual capacitance where the capacitance-sensing circuit has access to both electrodes of the capacitor; 2) self-capacitance where the capacitance-sensing circuit has only access to one electrode of the capacitor where the second electrode is tied to a DC voltage level or is parasitically coupled to Earth Ground. A touch panel has a distributed load of capacitance of both types (1) and (2) and Cypress' touch solutions sense both capacitances either uniquely or in hybrid form with its various sense modes.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

DETAILED DESCRIPTION

The following description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

The embodiments described herein are directed to detecting touchdowns (e.g., when a touch object initially contacts a touch panel) and liftoffs (e.g., when a touch object is removed from the touch panel). When a touchdown is detected, the change in a touch area (e.g., an area where a touch object is in contact with the touch panel) caused by the touchdown may not be reported as a movement of the touch object. When a liftoff is detected, the change in the touch area caused by the liftoff may not be reported as a movement of the touch object. When a touchdown or a liftoff is detected, different thresholds or threshold values are used to determine whether the touch object is moving. These different thresholds or threshold values may allow for more accurate detection of the movement of the touch object.

Figure 1:
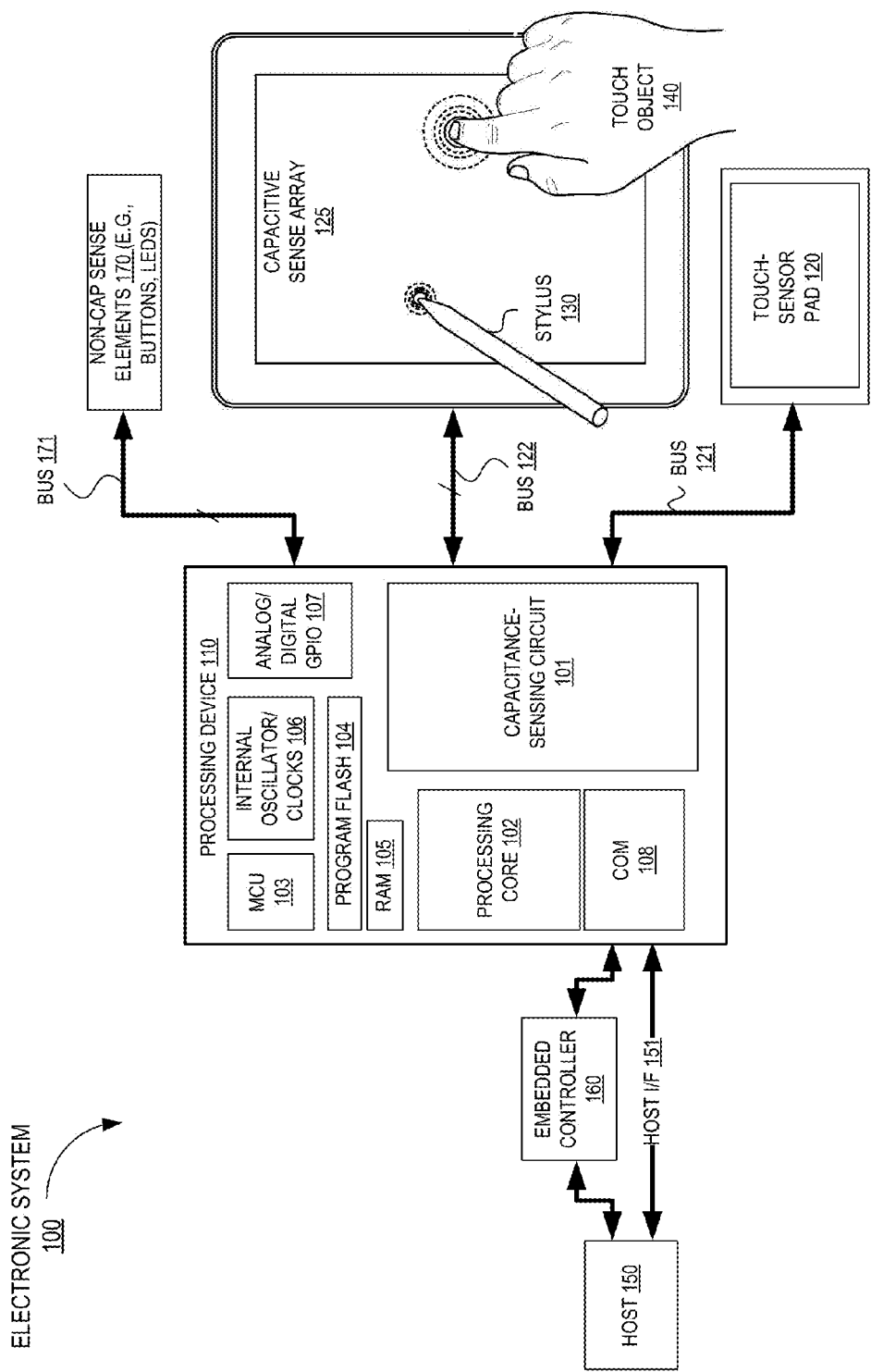
FIG. 1 is a block diagram illustrating one embodiment of an electronic system having a processing device for detecting a presence of a touch object and a stylus.

FIG. 1 is a block diagram illustrating one embodiment of an electronic system 100 having a processing device 110 for detecting a presence of a touch object 140 and a stylus 130. The processing device 110 selects an operating frequency in view of the measured frequency response. The processing device 110 is configured to detect one or more touches on a touch-sensing device, such as the capacitive sense array 125. The processing device can detect conductive objects, such as touch objects 140 (fingers or passive styluses), an active stylus 130, or any combination thereof.

The capacitance-sensing circuit 101 can measure touch data on the capacitive sense array 125. The touch data may be represented as multiple cells, each cell representing an intersection of sense elements (e.g., electrodes) of the capacitive sense array 125. In another embodiment, the touch data is a 2D capacitive image of the capacitive sense array 125. In one embodiment, when the capacitance-sensing circuit 101 measures mutual capacitance of the touch-sensing device (e.g., capacitive sense array 125), the capacitance-sensing circuit 101 obtains a 2D capacitive image of the touch-sensing device and processes the data for peaks and positional information. In another embodiment, the processing device 110 is a microcontroller that obtains a capacitance touch signal data set, such as from a sense array, and finger detection firmware executing on the microcontroller identifies data set areas that indicate touches, detects and processes peaks, calculates the coordinates, or any combination therefore. The firmware identifies the peaks using the embodiments described herein. The firmware can calculate a precise coordinate for the resulting peaks. In one embodiment, the firmware can calculate the precise coordinates for the resulting peaks using a centroid algorithm, which calculates a centroid of the touch, the centroid being a center of mass of the touch. The centroid may be an X/Y coordinate of the touch. Alternatively, other coordinate interpolation algorithms may be used to determine the coordinates of the resulting peaks. The microcontroller can report the precise coordinates to a host processor, as well as other information.

Electronic system 100 includes processing device 110, touch sensor pad 120, capacitive sense array 125, stylus 130, host processor 150, embedded controller 160, and non-capacitive sense elements 170. The capacitive sense elements are electrodes of conductive material, such as copper. The sense elements may also be part of an ITO panel. The capacitive sense elements can be configurable to allow the capacitive-sensing circuit 101 to measure self capacitance, mutual capacitance, or any combination thereof. Self-capacitance scanning is a method of detecting the presence of a conductive object by measuring the relative capacitance to ground. For example, using self-capacitance scanning, every row and column is scanned individually resulting in R+C scans. Mutual-capacitance scanning is a method of detecting the presence of a conductive object by measuring the relative capacitance between two electrodes (transmit (TX) electrodes and receive (RX) electrodes). For example, using mutual-capacitance scanning, each intersection (TX/RX intersection) is scanned. However, in some cases, the RX electrodes can be grouped together, resulting in NumRXGroups*TX scans. In the depicted embodiment, the electronic system 100 includes the capacitive sense array 125 coupled to the processing device 110 via bus 122. The capacitive sense array 125 may include a multi-dimension capacitive sense array. The multi-dimension sense array includes multiple sense elements, organized as rows and columns. In another embodiment, the capacitive sense array 125 operates as an all-points-addressable ("APA") mutual capacitive sense array. In another embodiment, the capacitive sense array 125 operates as a coupled-charge receiver. In another embodiment, the capacitive sense array 125 is non-transparent capacitive sense array (e.g., PC touchpad). The capacitive sense array 125 may be disposed to have a flat surface profile. Alternatively, the capacitive sense array 125 may have non-flat surface profiles. Alternatively, other configurations of capacitive sense arrays may be used. For example, instead of vertical columns and horizontal rows, the capacitive sense array 125 may have a hexagon arrangement, or the like, as would be appreciated by one of ordinary skill in the art having the benefit of this disclosure. In one embodiment, the capacitive sense array 125 may be included in an ITO panel or a touch screen panel.

In one embodiment, the electronic system 100 includes a touch sensor pad 120 coupled to the processing device 110 via bus 121. Touch sensor pad 120 may include a multi-dimension capacitive sense array. The multi-dimension sense array may include multiple sense elements, organized as rows and columns. In another embodiment, the touch sensor pad 120 is an APA mutual capacitance sense array. In another embodiment, the touch sensor pad 120 operates as a coupled-charge receiver.

The operations and configurations of the processing device 110 and the capacitive sense array 125 for detecting and tracking the touch object 140 and stylus 130 are described herein. In short, the processing device 110 is configurable to detect a presence of the touch object 140, a presence of a stylus 130 on the capacitive sense array 125, or any combination thereof. The processing device 110 may detect and track the stylus 130 and the touch object 140 individually on the capacitive sense array 125. In one embodiment, the processing device 110 can detect and track both the stylus 130 and touch object 140 concurrently on the capacitive sense array 125. If the touching object is an active stylus, in one embodiment, the active stylus 130 is configurable to operate as the timing "master," and the processing device 110 adjusts the timing of the capacitive sense array 125 to match that of the active stylus 130 when the active stylus 130 is in use. In one embodiment, the capacitive sense array 125 capacitively couples with the active stylus 130, as opposed to conventional inductive stylus applications. It should also be noted that the same assembly used for the capacitive sense array 125, which is configurable to detect touch objects 140, is also used to detect and track a stylus 130 without an additional PCB layer for inductively tracking the active stylus 130.

In the depicted embodiment, the processing device 110 includes analog and/or digital general purpose input/output ("GPIO") ports 107. GPIO ports 107 may be programmable. GPIO ports 107 may be coupled to a Programmable Interconnect and Logic ("PIL"), which acts as an interconnect between GPIO ports 107 and a digital block array of the processing device 110 (not shown). The digital block array may be configurable to implement a variety of digital logic circuits (e.g., DACs, digital filters, or digital control systems) using, in one embodiment, configurable user modules ("UMs"). The digital block array may be coupled to a system bus. Processing device 110 may also include memory, such as random access memory ("RAM") 105 and program flash 104. RAM 105 may be static RAM ("SRAM"), and program flash 104 may be a non-volatile storage, which may be used to store firmware (e.g., control algorithms executable by processing core 102 to implement operations described herein). Processing device 110 may also include a memory controller unit ("MCU") 103 coupled to memory and the processing core 102. The processing core 102 is a processing element configured to execute instructions or perform operations. The processing device 110 may include other processing elements as would be appreciated by one of ordinary skill in the art having the benefit of this disclosure. It should also be noted that the memory may be internal to the processing device or external to it. In the case of the memory being internal, the memory may be coupled to a processing element, such as the processing core 102. In the case of the memory being external to the processing device, the processing device is coupled to the other device in which the memory resides as would be appreciated by one of ordinary skill in the art having the benefit of this disclosure.

The processing device 110 may also include an analog block array (not shown). The analog block array is also coupled to the system bus. Analog block array may also be configurable to implement a variety of analog circuits (e.g., ADCs or analog filters) using, in one embodiment, configurable UMs. The analog block array may also be coupled to the GPIO 107.

As illustrated, capacitance-sensing circuit 101 may be integrated into processing device 110. Capacitance-sensing circuit 101 may include analog I/O for coupling to an external component, such as touch sensor pad 120, capacitive sense array 125, touch-sensor slider (not shown), touch-sensor buttons (not shown), and/or other devices. The capacitance-sensing circuit 101 may be configurable to measure capacitance using mutual-capacitance sensing techniques, self-capacitance sensing technique, charge coupling techniques, or the like. In one embodiment, capacitance-sensing circuit 101 operates using a charge accumulation circuit, a capacitance modulation circuit, or other capacitance sensing methods known by those skilled in the art. In an embodiment, the capacitance-sensing circuit 101 is of the Cypress TMA-3xx, TMA-4xx, or TMA-xx families of touch screen controllers. Alternatively, other capacitance-sensing circuits may be used. The mutual capacitive sense arrays, or touch screens, as described herein, may include a transparent, conductive sense array disposed on, in, or under either a visual display itself (e.g. LCD monitor), or a transparent substrate in front of the display. In an embodiment, the TX and RX electrodes are configured in rows and columns, respectively. It should be noted that the rows and columns of electrodes can be configured as TX or RX electrodes by the capacitance-sensing circuit 101 in any chosen combination. In one embodiment, the TX and RX electrodes of the capacitive sense array 125 are configurable to operate as a TX and RX electrodes of a mutual capacitive sense array in a first mode to detect touch objects, and to operate as electrodes of a coupled-charge receiver in a second mode to detect a stylus on the same electrodes of the sense array. The stylus, which generates a stylus TX signal when activated, is used to couple charge to the capacitive sense array, instead of measuring a mutual capacitance at an intersection of a RX electrode and a TX electrode (a sense element) as done during mutual-capacitance sensing. An intersection between two sense elements may be understood as a location at which one sense electrode crosses over or overlaps another, while maintaining galvanic isolation from each other. The capacitance-sensing circuit 101 does not use mutual-capacitance or self-capacitance sensing to measure capacitances of the sense elements when performing a stylus sensing. Rather, the capacitance-sensing circuit 101 measures a charge that is capacitively coupled between the capacitive sense array 125 and the stylus as described herein. The capacitance associated with the intersection between a TX electrode and an RX electrode can be sensed by selecting every available combination of TX electrode and RX electrode. When a touch object, such as a finger or stylus, approaches the capacitive sense array 125, the object causes a decrease in mutual capacitance between some of the TX/RX electrodes. In another embodiment, the presence of a finger increases the coupling capacitance of the electrodes. Thus, the location of the finger on the capacitive sense array 125 can be determined by identifying the RX electrode having a decreased coupling capacitance between the RX electrode and the TX electrode to which the TX signal was applied at the time the decreased capacitance was measured on the RX electrode. Therefore, by sequentially determining the capacitances associated with the intersection of electrodes, the locations of one or more inputs can be determined. It should be noted that the process can calibrate the sense elements (intersections of RX and TX electrodes) by determining baselines for the sense elements. It should also be noted that interpolation may be used to detect finger position at better resolutions than the row/column pitch as would be appreciated by one of ordinary skill in the art having the benefit of this disclosure. In addition, various types of coordinate interpolation algorithms may be used to detect the center of the touch as would be appreciated by one of ordinary skill in the art having the benefit of this disclosure.

In an embodiment, the electronic system 100 may also include non-capacitive sense elements 170 coupled to the processing device 110 via bus 171 and GPIO port 107. The non-capacitive sense elements 170 may include buttons, light emitting diodes ("LEDs"), and other user interface devices, such as a mouse, a keyboard, or other functional keys that do not use capacitance sensing. In one embodiment, buses 121, 122, and 171 are embodied in a single bus. Alternatively, these buses may be configured into any combination of one or more separate buses.

Processing device 110 may include internal oscillator/clocks 106 and communication block ("COM") 108. In another embodiment, the processing device 110 includes a spread spectrum clock (not shown). The oscillator/clocks block 106 provides clock signals to one or more of the components of processing device 110. Communication block 108 may be used to communicate with an external component, such as a host processor 150, via host interface ("I/F") line 151. Alternatively, processing device 110 may also be coupled to embedded controller 160 to communicate with the external components, such as host processor 150. In one embodiment, the processing device 110 is configurable to communicate with the embedded controller 160 or the host processor 150 to send and/or receive data.

Processing device 110 may reside on a common carrier substrate such as, for example, an integrated circuit ("IC") die substrate, a multi-chip module substrate, or the like. Alternatively, the components of processing device 110 may be one or more separate integrated circuits and/or discrete components. In one exemplary embodiment, processing device 110 is the Programmable System on a Chip (PSoC®) processing device, developed by Cypress Semiconductor Corporation, San Jose, Calif. Alternatively, processing device 110 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of a processing device coupled to a host, but may include a system that measures the capacitance on the sensing device and sends the raw data to a host computer where it is analyzed by an application. In effect, the processing that is done by processing device 110 may also be done in the host.

Capacitance-sensing circuit 101 may be integrated into the IC of the processing device 110, or alternatively, in a separate IC. Alternatively, descriptions of capacitance-sensing circuit 101 may be generated and compiled for incorporation into other integrated circuits. For example, behavioral level code describing the capacitance-sensing circuit 101, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout may represent various levels of abstraction to describe capacitance-sensing circuit 101.

It should be noted that the components of electronic system 100 may include all the components described above. Alternatively, electronic system 100 may include some of the components described above.

In one embodiment, the electronic system 100 is used in a tablet computer. Alternatively, the electronic device may be used in other applications, such as a notebook computer, a mobile handset, a personal data assistant ("PDA"), a smartphone, a keyboard, a television, a remote control, a monitor, a handheld multi-media device, a handheld media (audio and/or video) player, a handheld gaming device, a signature input device for point of sale transactions, an eBook reader, global position system ("GPS") or a control panel. The embodiments described herein are not limited to touch screens or touch-sensor pads for notebook implementations, but can be used in other capacitive sensing implementations, for example, the sensing device may be a touch-sensor slider (not shown) or touch-sensor buttons (e.g., capacitance sensing buttons). In one embodiment, these sensing devices include one or more capacitive sensors or other types of capacitance-sensing circuitry. The operations described herein are not limited to notebook pointer operations, but can include other operations, such as lighting control (dimmer), volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (e.g., display brightness and contrast), scroll-wheels, multi-media control (e.g., volume, track advance, etc.) handwriting recognition, and numeric keypad operation.

In one embodiment, a capacitive touch screen panel includes an insulator such as glass, coated with a transparent conductor such as indium tin oxide (ITO). As described herein, the capacitive touch screen panel may include multiple electrodes that are typically laid out in rows and columns. A column or columns of electrodes could be driven with a TX signal and a row or rows of electrodes could be used to measure a corresponding RX signal. The capacitance at an intersection (also called a sensor) between the TX electrode and the RX electrode can be measured. When a conductive object (e.g., finger) is proximate to the intersection, the capacitance between the TX electrode and the RX electrode changes and the change can be measured to detect a conductive object proximate to the touch screen panel. The farther away from the TX signal source, the more electrodes can add capacitance and resistance. The farther away from the RX sensing input, the more electrodes can add capacitance and resistance. It should be noted that various embodiments are described in relation to touch screen panels. However, the embodiments described herein can be used in other touch panels.

Figure 2:
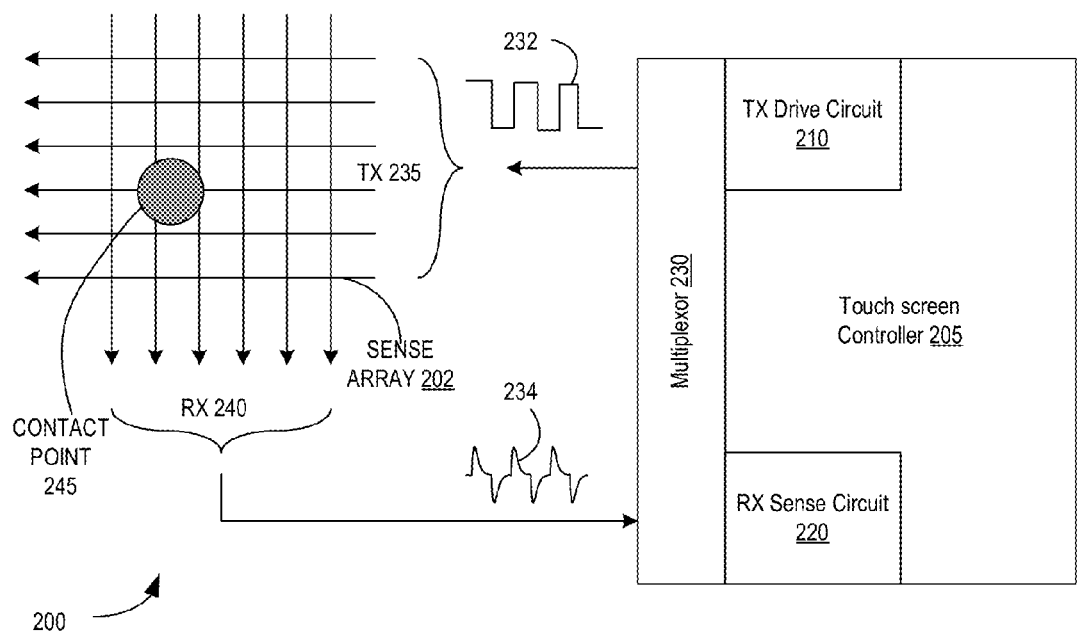
FIG. 2 is a block diagram illustrating a system including a capacitive sense array and a touch screen controller that converts measured capacitances to touch coordinates, according to an embodiment.

FIG. 2 is a block diagram illustrating one embodiment of a system 200 including the sense array 202 and a touch screen controller 205 that converts measured capacitances to touch coordinates. In an embodiment, the touch screen controller 205 is similar to the capacitance-sensing circuit 101 described above. In another embodiment, the touch screen controller 205 is the processing device 110. The sense array 202 includes TX lines 235 and RX lines 240. In an embodiment, the touch screen controller 205 includes a TX drive circuit 210, an RX sense circuit 220, and a multiplexor 230.

In an embodiment, a passive object (e.g., a finger or other conductive object) touches, or comes in close proximity to, the sense array 202 at contact point 245. The TX drive circuit 210 drives the TX lines 235 with TX signal 232. In one embodiment, TX driver circuit 210 may include a signal generator. The RX sense circuit 220 measures the RX signal 234 on RX lines 240. In an embodiment, the touch screen controller 205 determines the location of contact point 245. The TX lines 235 and RX lines 240 are multiplexed by multiplexor 230. The touch screen controller 205 provides the TX signal 232 on the TX lines 235 (rows) and measures the capacitance coupling on the RX lines 240 (columns). In an embodiment, the TX and RX lines 235, 240 are orthogonal and may be used interchangeably (e.g., transmitting on columns and receiving on rows). In an embodiment, the TX drive circuit 210 transmits the TX signal 232 through a high impedance ITO panel (TX lines 235), thus limiting the upper frequency limit and speed of the system. The total scan time may also depend upon the number of TX lines 235 and RX lines 240 in the sense array 202. For example, the TX drive circuit 210 provides a TX signal 232 on each TX line 235 and simultaneously reads the capacitively coupled RX signal 234 on each RX line 240, according to one embodiment. In another embodiment, the RX lines 240 are multiplexed in two or more scans. This may be one (of multiple) modes of operation of touch screen controller 205 (e.g., a touch mode or a finger mode).

Although the electrodes (e.g., lines 235 and 240) appear as lines in FIG. 2, these electrodes may represent bars or elongated rectangles or other tessellated shapes such as diamonds, rhomboids, and chevrons. Alternatively, other useable shapes may be used as would be appreciated by one of ordinary skill in the art having the benefit of this disclosure.

Figure 3A:
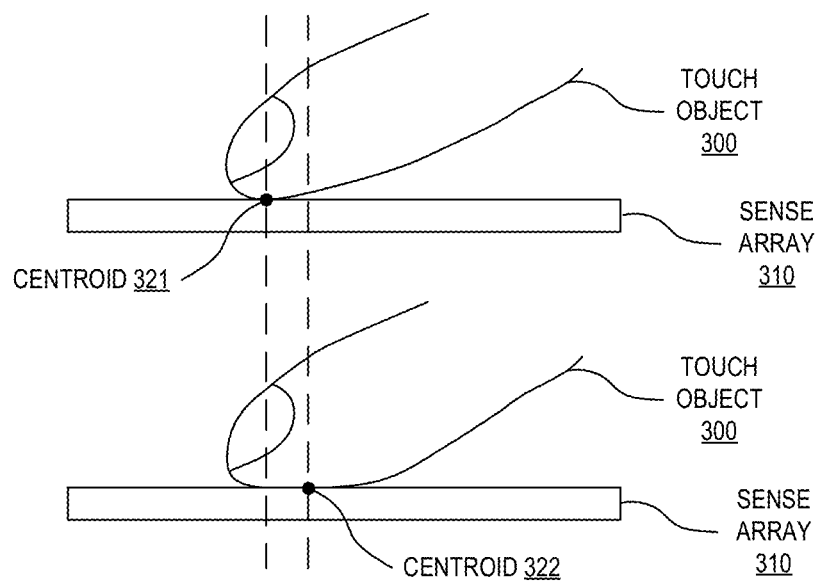
FIG. 3A is a diagram illustrating a touch event, according to one embodiment.

FIG. 3A is a diagram illustrating a touch event, according to one embodiment. In one embodiment, the touch event illustrated in FIG. 3A may be a touchdown of the touch object 300 (e.g., a touch event that occurs when the touch object 300 initially comes into contact with the sense array 310). The touch object 300 may include, but is not limited to, passive touch objects, a conductive object, a passive stylus, a finger, etc. As illustrated in FIG. 3A, the touch object 300 moves towards the sense array 310 (e.g., the touch object 300 moves such that the touch object 300 is proximate to the sense array 310). As the touch object 300 comes into contact with the sense array 310, the touch object 300 may be detected by the sense array 310 before the touch object 300 is fully settled on the sense array 310. A processing device or touch screen controller may determine that centroid 321 of the touch area (e.g., an area where the touch object comes into contact with the sense array 310) is at the position denoted by the left dotted line.

Because the touch object 300 may be deformable, the centroid of the touch area may change as the touch object 300 settles into position on the sense array 310. For example, if the touch object 300 is a finger, the tip of the finger may be deformable (e.g., soft or malleable). As the finger (e.g., touch object 300) is pushed into the sense array 310, the tip of the finger may flatten against the surface of the sense array 310 (e.g., against a substrate of the sense array 310). As the finger flattens against the surface of the sense array 310, the touch area (e.g., the area where the touch object comes into contact with the sense array 310) may change. When the finger settles into position on the sense array 310, the processing device or touch screen controller may determine that the centroid 322 of the touch area is at the position denoted by the right dotted line.

As illustrated in FIG. 3A, the centroid 322 (of the touch area after the touch object 300 has settled) is to the right of the centroid 321 (of the touch area when the touch object 300 initially comes into contact with the sense array 310). The change in the positions of centroid 321 and centroid 322 may be large (e.g., 1 millimeter, 2 millimeters, etc.). This change in the positions of centroid 321 and centroid 322 may cause the processing device or touch screen controller to determine that the touch object has moved (e.g., has changed position). For example, the processing device or touch screen controller may detect the change in the positions of centroid 321 and 322 as a change in the position of the touch object 300. However, the settling of the touch object 300 onto the sense array 310 should not be considered a movement of the touch object 300 as the touch object is in the same general position or location as before.

In one embodiment, the touch object 300 may not directly contact the sense array 310 (e.g., may not directly contact the electrodes in the sense array 310). For example, the touch object 300 may contact a substrate above the sense array 310 or may contact a substrate on which the sensor array 310 is deposited. The substrate may be a dielectric material (e.g., glass).

Figure 3B:
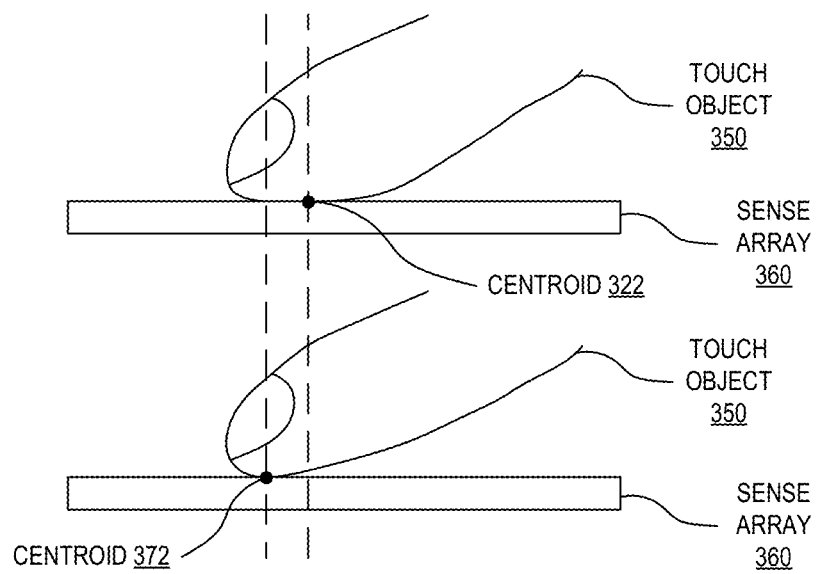
FIG. 3B is a diagram illustrating a touch event, according to one embodiment.

FIG. 3B is a diagram illustrating a touch event, according to another embodiment. In one embodiment, the touch event illustrated in FIG. 3B may be a liftoff of the touch object 350 (e.g., a touch event that occurs when the touch object 350 is removed from the sense array 360). The touch object 350 may include, but is not limited to, passive touch objects, a conductive object, a passive stylus, a finger, etc. As illustrated in FIG. 3B, the touch object 350 has settled on the sense array 360 (e.g., the touch object 350 is proximate to the sense array 360). The touch object 350 may be detected by the sense array 360 and a processing device or touch screen controller may determine that centroid 371 of the touch area (e.g., an area where the touch object comes into contact with the sense array 360) is at the position denoted by the right dotted line.

Because the touch object 350 may be deformable, the centroid of the touch area may change as the touch object 350 is removed from the surface of the sense array 360. For example, if the touch object 350 is a finger, the tip of the finger may be deformable (e.g., soft or malleable). As the finger (e.g., touch object 350) is lifted off of surface the sense array 360 (e.g., removed from the surface of the sense array 360), the tip of the finger may unflatten. As the finger unflattens, the touch area (e.g., the area where the touch object comes into contact with the sense array 360) may change. As the touch object 350 is removed from the surface of the sense array 360, the processing device or touch screen controller may determine that the centroid 372 of the touch area is at the position denoted by the left dotted line.

As illustrated in FIG. 3B, the centroid 372 (of the touch area after the touch object 350 has settled) is to the left of the centroid 371 (of the touch area when the touch object 350 initially comes into contact with the sense array 360). The change in the positions of centroid 371 and centroid 372 may cause the processing device or touch screen controller to determine that the touch object has moved (e.g., has changed position). For example, the processing device or touch screen controller may detect the change in the positions of centroid 371 and 372 as a change in the position of the touch object 350. However, the removal of the touch object 350 from the sense array 360 should not be considered a movement of the touch object 350 as the touch object is in the same general position or location as before.

In one embodiment, the touch object 350 may not directly contact the sense array 360 (e.g., may not directly contact the electrodes in the sense array 360). For example, the touch object 350 may contact a substrate above the sense array 360 or may contact a substrate on which the sensor array 360 is deposited. The substrate may be a dielectric material (e.g., glass).

Figure 4:
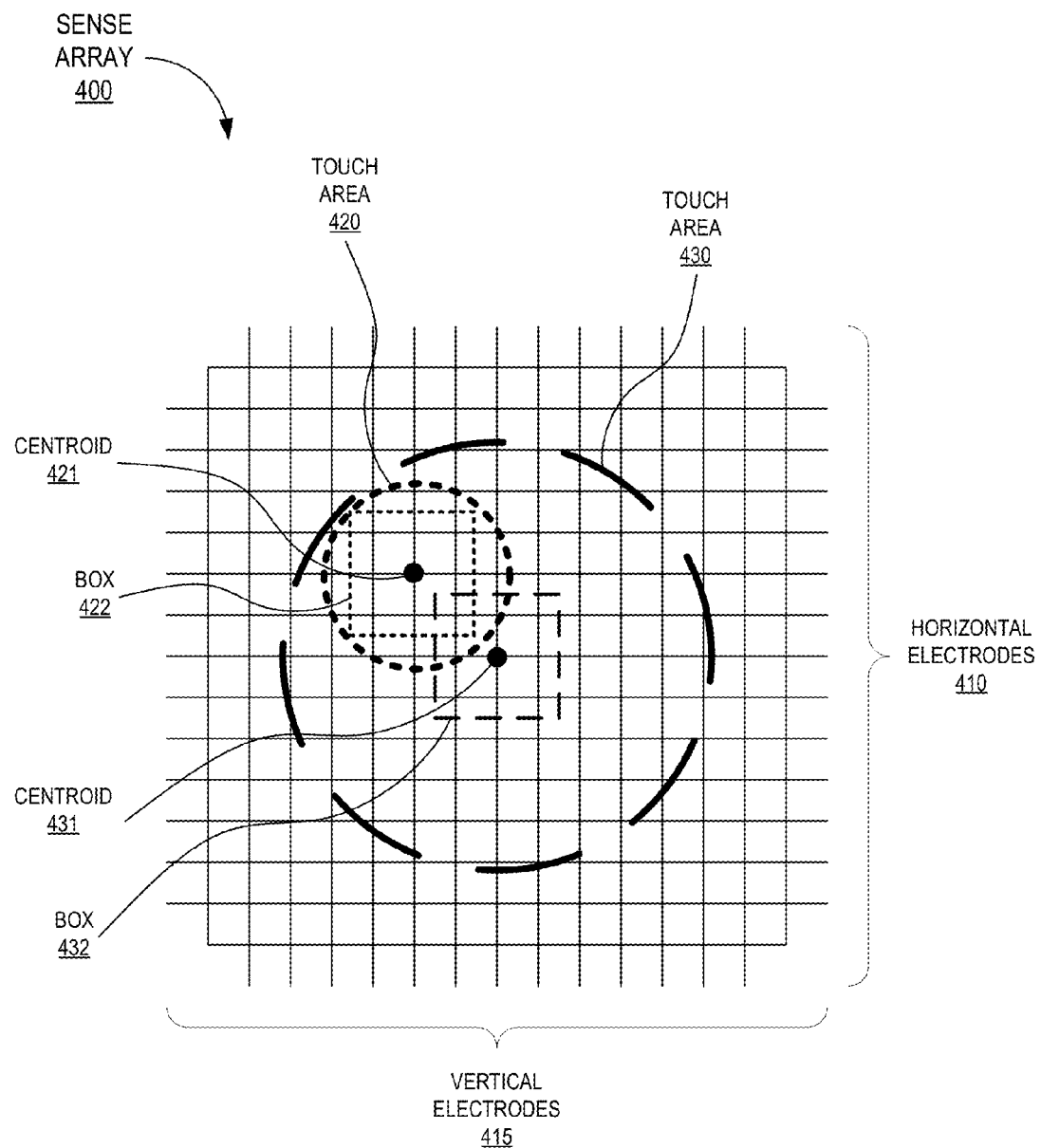
FIG. 4 is a diagram illustrating a sense array, according to one embodiment.

FIG. 4 is a diagram illustrating a sense array 400, according to one embodiment. The sense array 400 includes horizontal electrodes 410 and vertical electrodes 415. The horizontal electrodes 410 intersect with the vertical electrodes 415. In one embodiment, a processing device (such as processing device 110 illustrated in FIG. 1) may use the sense array 400 to detect the presence of one or more touch objects (e.g., to detect the presence of a touch object, such as a finger, proximate to the sense array 400). For example, the processing device may use mutual-capacitance scanning to detect the presence of a conductive object by measuring the relative capacitance at an intersection between two electrodes (e.g., at an intersection between a vertical electrode and a horizontal electrode). The processing device may determine whether the presence of a touch object proximate to the sense array 400 (e.g., a touch event) is a touchdown, a liftoff, or neither.

As discussed above in conjunction with FIGS. 3A and 3B, when a touch object initially comes into contact with the sense array 400 (e.g., touches down onto the surface of the sense array 400), the touch area (e.g., the area where the touch object comes into contact with the sense array 400) may change. For example, when a touch object initially comes into contact with the sense array 400, the touch area of the touch object may change from touch area 420 to touch area 430 (e.g., the touch area may increase in size). Similarly, when the touch object is removed from the sense array 400 (e.g., lifts off from the surface of the sense array 400), the touch area may change. For example, when a touch object is removed (e.g., lifts off) from the surface of the sense array 400, the touch area of the touch object may change from touch area 430 to touch area 420 (e.g., the touch area may decrease in size).

In one embodiment, a processing device may detect an increase in the capacitance values detected at the intersections of electrodes when a touch object initially comes into contact with the sense array 400 (e.g., touches down). For example, as the touch object moves closer to the sense array 400, the touch area may change from touch area 420 to touch area 430. The capacitance values at an intersection of electrodes within the touch area 430 may be larger than the capacitance values at the intersection of electrodes within the touch area 420. The processing device may determine whether the increase in the capacitance values is greater than a touchdown threshold (e.g., a threshold value). For example, the processing device may determine whether the sum of a plurality of capacitance values has increased by more than the touchdown threshold (e.g., by more than the threshold value). If the capacitance values have not increased by more than the touchdown threshold, the processing device may determine that a touchdown has not occurred.

In one embodiment, a processing device may detect a decrease in the capacitance values detected at the intersections of electrodes when a touch object is removed from the surface of the sense array 400 (e.g., lifts off). For example, as the touch object moves away to the sense array 400, the touch area may change from touch area 430 to touch area 420. The capacitance values at an intersection of electrodes within the touch area 420 may be smaller than the capacitance values at the intersection of electrodes within the touch area 430. The processing device may determine whether the decrease in the capacitance values is greater than a liftoff threshold (e.g., a threshold value). For example, the processing device may determine whether the sum of a plurality of capacitance values has increased by more than the touchdown threshold (e.g., by more than the threshold value). If the capacitance values have not increased by more than the touchdown threshold, the processing device may determine that a liftoff has not occurred.

In one embodiment, the touchdown threshold and the liftoff threshold may have the same value. In another embodiment, the touchdown threshold and the liftoff threshold may have different values. It should be understood that various different values, measurement units, etc., may be used for the touchdown threshold and the liftoff threshold.

In one embodiment, the processing device may use a subset of the intersections of electrodes in the touch area 420 and a subset of the intersections of electrodes in the touch area 430 to determine whether the capacitance values have increased or decreased. For example, the processing device may use intersections of electrodes located in box 422 to determine capacitance values for touch area 420. The box 422 may be centered around the centroid 421 of the touch area 420. The processing device may also use the intersections of electrodes located in box 432 to determine capacitance values for touch area 430. The box 432 may be centered around the centroid 431 of the touch area 430. In another embodiment, the processing device may use any number of the intersections of electrodes within the touch areas 420 and 430. For example, the processing device may use all of the intersections of electrodes within the touch area 420. In a further embodiment, the intersections of electrodes may be not centered around the centroids 421 and 431.

In one embodiment, the processing device may determine the change in a size of a touch area for the touch object to determine whether the presence of the touch object proximate to the sense array 400 (e.g., a touch event) is a touchdown, a liftoff, or neither. For example, when a touch object touches down onto the sense array 400, the size (e.g., the area) of the touch area may increase from the size of touch area 420 to the size of touch area 430. If increase in the size of the touch area is greater than the touchdown threshold (e.g., a threshold value), the processing device may determine that a touch occurred. In another example, when a touch object lifts off from the sense array 400, the size (e.g., the area) of the touch area may decrease from the size of touch area 430 to the size of touch area 420. If decrease in the size of the touch area is greater than the liftoff threshold (e.g., a threshold value), the processing device may determine that a touch occurred. In one embodiment, the processing device may use a combination of both the change in size and the change in capacitance values to determine whether the presence of the touch object proximate to the sense array 400 is a touchdown, a liftoff, or neither.

In some embodiments, the processing device may use different movement thresholds or different threshold values for determining whether the touch object has moved, based on whether a touchdown or a liftoff has occurred. For example, if a touchdown or a liftoff has occurred, the processing device may use a first movement threshold (e.g., a first threshold value) in order to determine whether the touch object has moved. The processing device may use a second movement threshold (e.g., a second threshold value) in order to determine whether the touch object has moved if neither a touchdown nor a liftoff has occurred. The different movement thresholds or different threshold values are discussed in more detail below in conjunction with FIGS. 5-7. In one embodiment, one or more of the different movement thresholds and the different threshold values may be configurable. For example, a user of a touch screen device (e.g., a tablet computer, a smartphone, a touch screen monitor, etc.) may provide input (e.g., user input) indicating values for one or more of the different movement thresholds and the different threshold values. In another example, a manufacturer, a seller, or a distributor of a touch screen device may provide input indicating values for one or more of the different movement thresholds and the different threshold values.

Figure 5:
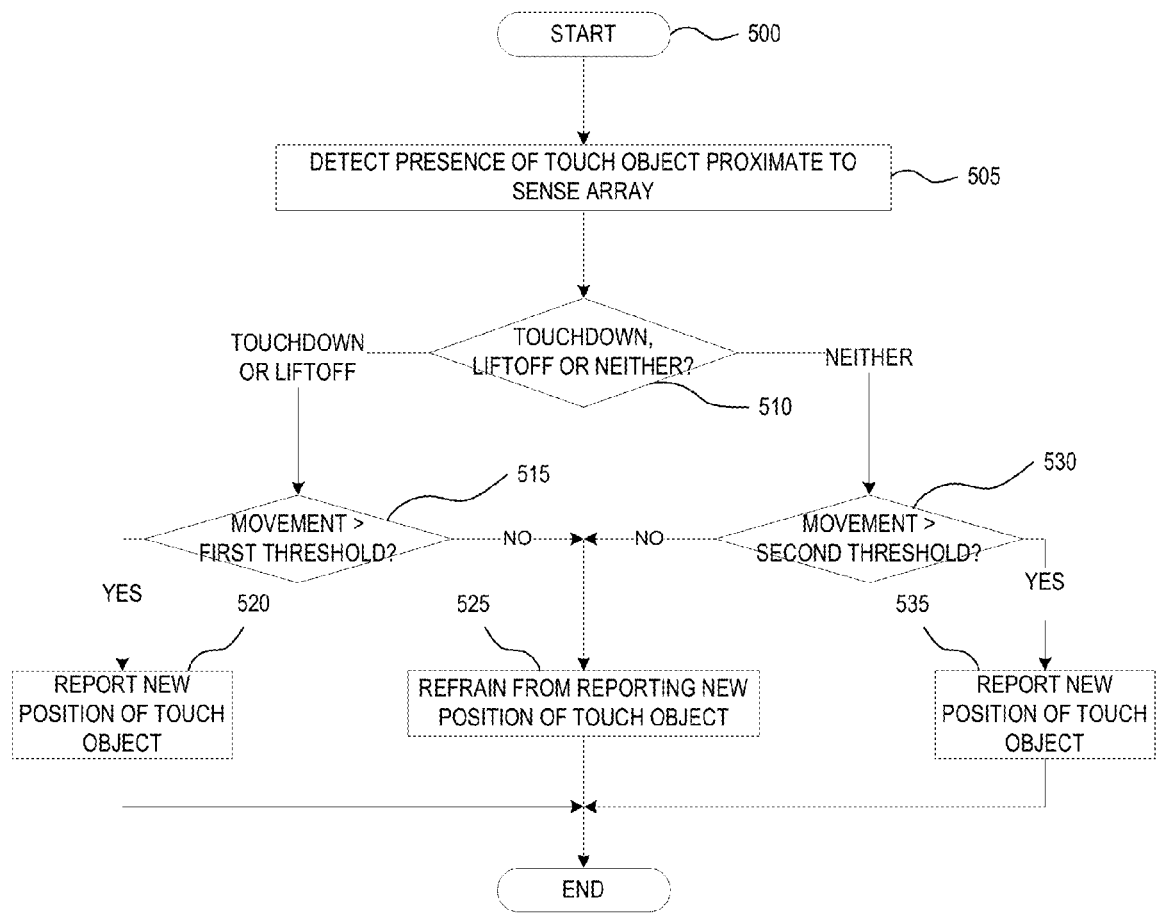
FIG. 5 is a flow chart of another embodiment of a method of detecting a touch object, according to one embodiment.

FIG. 5 is a flow chart of another embodiment of a method 500 of detecting a touch object. The method 500 may be performed by processing logic that may comprise hardware (circuitry, dedicated logic, gates, programmable logic, etc.), software (such as is run on a general purpose computing system or a dedicated machine), firmware (embedded software), or any combination thereof. In one embodiment, the processing device 110 illustrated in FIG. 1 may perform the method 500. Alternatively, other components of the electronic systems illustrated in FIGS. 1 and 2 may perform some or all of the operations of method 500.

Referring to FIG. 5, the method 500 begins at block 505 where the processing logic may detect the presence of a touch object (e.g., a finger) proximate to a sense array. For example, the processing logic may detect the present of the touch object by scanning the intersections of electrodes in the sense array and measuring the capacitance the values at the intersections of electrodes. At block 510, the processing logic determines whether the presence of the touch object is a touchdown, a liftoff, or neither. For example, as discussed above in conjunction with FIG. 4, the processing logic may determine that the increase in the capacitance values of a touch area is greater than a touchdown threshold (e.g., a threshold value) and may determine that the presence of the touch object is a touchdown. In another example, as discussed above in conjunction with FIG. 4, the processing logic may determine that the decrease in the capacitance values of a touch area is greater than a liftoff threshold (e.g., a threshold value) and may determine that the presence of the touch object is a liftoff. In a further example, the processing logic may determining that the change in capacitance is not greater than the touchdown threshold and is not greater than the liftoff threshold, and the processing logic may determine that the presence of the touch object proximate to the sense array is neither a touch down a liftoff.

If the processing logic determines that the presence of the touch object is a touchdown, the processing logic may determine whether a movement of the object (e.g., a change in the position of the touch object or a change in the position of a centroid of a touch area for the touch object) is greater than a first threshold (block 515). The first threshold may be any value that may be used by the processing logic to whether a movement of the touch object should be reported. For example, the threshold may represent a threshold number of pixels on a screen (e.g., 3 pixels, 10 pixels, etc.) and the processing logic may not report the movement of the touch object is the movement is less than the number of pixels. In another example, the first threshold may represent a threshold distance on the screen (e.g., 1 millimeter, 100 nanometers, etc.) and the processing logic may not report the movement of the touch object is the movement is less than the distance. In a further example, the threshold may represent the acceleration of the movement of the touch object (e.g., the change in the speed of the movement of the touch object) and the processing logic may determine whether the acceleration of the movement of the touch object is greater than the threshold. If the movement is greater than the first threshold, the processing logic reports the new position (e.g., the changed position) of the touch object at block 520. After block 520 the method 500 ends. If the movement is less than the first threshold, the processing logic refrains from reporting the new position of the touch object at block 525. For example, the processing logic may report a previous position of the touch object (e.g., may report the last position before the new position or any previous position before the new position). In another example, the processing logic may refrain from reporting any position of the touch object (e.g., may not send a report or message indicating a position of the touch object). After block 525, the method 500 ends.

Referring back to block 510, if the presence of the touch object is neither a liftoff or a touchdown, the processing logic determines whether the movement of the touch object is greater than a second threshold (block 530). The second threshold may also be any value that may be used by the processing logic to whether a movement of the touch object (e.g., a change in the position of a centroid of a touch area for the touch object) should be reported. For example, the second threshold may be a number of pixels or a distance. If the movement is greater than the second threshold, the processing logic reports the new position (e.g., the changed position) of the touch object at block 535. After block 535, the method 500 ends. If the movement is less than the second threshold, the method 500 refrains from reporting the position of the touch object at block 525. After block 525, the method 500 ends.

Figure 6:
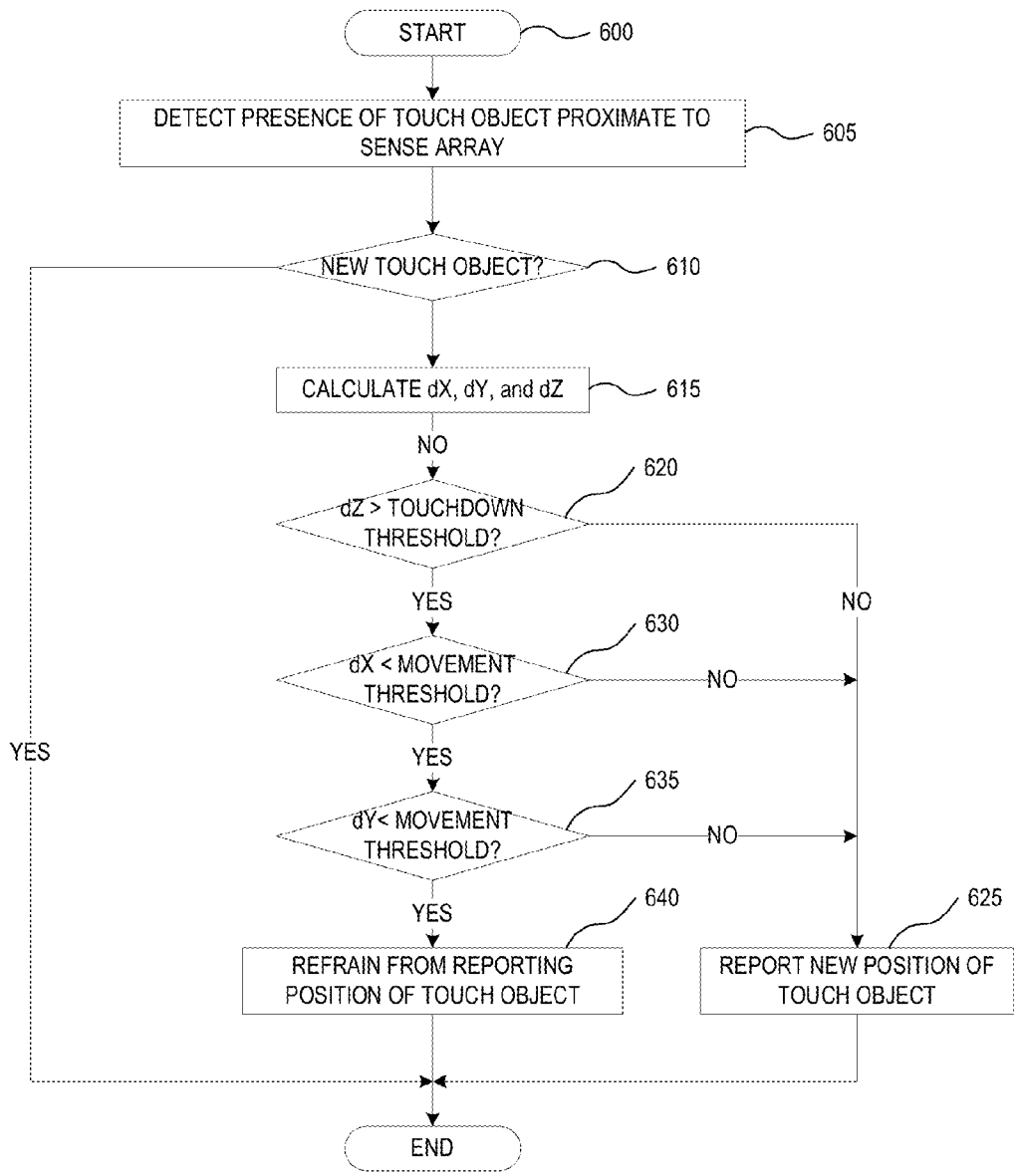
FIG. 6 is a flow chart of another embodiment of a method of detecting a touchdown of a touch object, according to one embodiment.

FIG. 6 is a flow chart of another embodiment of a method 600 of detecting a touchdown of a touch object, according to one embodiment. The method 600 may be performed by processing logic that may comprise hardware (circuitry, dedicated logic, gates, programmable logic, etc.), software (such as is run on a general purpose computing system or a dedicated machine), firmware (embedded software), or any combination thereof. In one embodiment, the processing device 110 illustrated in FIG. 1 may perform the method 600. Alternatively, other components of the electronic systems illustrated in FIGS. 1 and 2 may perform some or all of the operations of method 600.

Referring to FIG. 6, the method 600 begins at block 605 where the processing logic may detect the presence of a touch object (e.g., a finger) proximate to a sense array. At block 610, the processing logic determines whether the touch object is a new touch object. For example, the processing logic determines whether the touch object is new finger that was not previously detected. If the touch object is a new touch object (e.g., a touch object that was not previously detected), the method 600 ends because there may not be previous positions, capacitance values, or touch areas that may be used to determine whether the presence of the touch object proximate to the sense array comprises a touchdown. In one embodiment, the processing logic may not report the position of the touch object if the touch object is a new touch object. If the touch object is not a new touch object, the processing logic calculates dX, dY, and dZ for the touch object at block 615. In one embodiment, dX may be a value (e.g., a number of pixels, a distance, etc.) that indicates a distance that the touch object has moved in a horizontal direction (e.g., along an X-axis of a touch screen). For example, dX may be the value 10, indicating that the touch object has move 10 pixels (to the right or left) in a horizontal direction. In one embodiment, dY may be a value (e.g., a number of pixels, a distance, etc.) that indicates a distance that the touch object has moved in a vertical direction (e.g., along a Y-axis of a touch screen). For example, dY may be the value 2, indicating that the touch object has move 2 millimeters (up or down) in a vertical direction. In one embodiment, dZ may be a value that indicates the change in capacitance values in a touch area (as discussed above in conjunction with FIG. 4). In another embodiment, dZ may also be a value that indicates the change in the size of the touch area (as discussed above in conjunction with FIG. 4).

At block 620, the processing logic determines whether dZ is greater than a touchdown threshold (e.g., a threshold change in capacitances or a threshold change in the size of the touch area). If dZ is less than or equal to the touchdown threshold, the processing logic proceeds to block 625 where the processing logic reports the new position of the touch object (e.g., reports the changed or new position of the touch object). After block 625, the method 600 ends. If dZ is greater than the touchdown threshold, this may indicate that the presence of the touch object is a touchdown and the processing logic proceeds to block 630. At block 630, the processing logic determines whether dX is less than a movement threshold. If dX is less than the movement threshold, this may indicate that the touch object is not moving significantly in a horizontal direction and the processing logic proceeds to block 635. For example, if dX is not greater than the movement threshold, this may indicate that the touch object has not moved has moved very little in the horizontal direction. If dX is greater than the movement threshold, this may indicate that the touch object is moving in a horizontal direction and the processing logic proceeds to block 625 where the processing logic reports the position of the touch object (e.g., the new or current position of the touch object). At block 635, the processing logic determines whether dY is less than a movement threshold. If dY is greater than the movement threshold, this may indicate that the touch object is moving in a vertical direction and the processing logic proceeds to block 625 where the processing logic reports the position of the touch object (e.g., the new or current position of the touch object). If dY is not greater than the movement threshold, this may indicate that the touch object is also not moving significantly in a vertical direction and the processing logic proceeds to block 640. For example, if dY is not greater than the movement threshold, this may indicate that the touch object has not moved has moved very little in the vertical direction.

At block 640, the processing logic may determine that the presence of the touch object is a touchdown because dZ is greater than the touchdown threshold (e.g., the change in capacitances or change in size of the touch area is greater than a threshold) and dX and dY are both less than the movement threshold indicating that the touch object has not moved in a vertical or horizontal direction. The processing logic may refrain from reporting the position of the touch object at block 640. For example, the processing logic may not send any report indicating a position of the touch object. In another example, the processing logic may report a previous position of the touch object. For example, the processing logic may report the last position of the touch object. After block 640, the method 600 ends.

In one embodiment, the processing logic may perform the method 600 on each touch object that is detected. For example, a user may touch a touch screen with three fingers (e.g., three touch objects). The processing logic may perform the method 600 three times, once for each finger, to determine whether the finger is touching down onto the touch screen. In another embodiment, different movement thresholds may be used at blocks 630 and 635.

Figure 7:
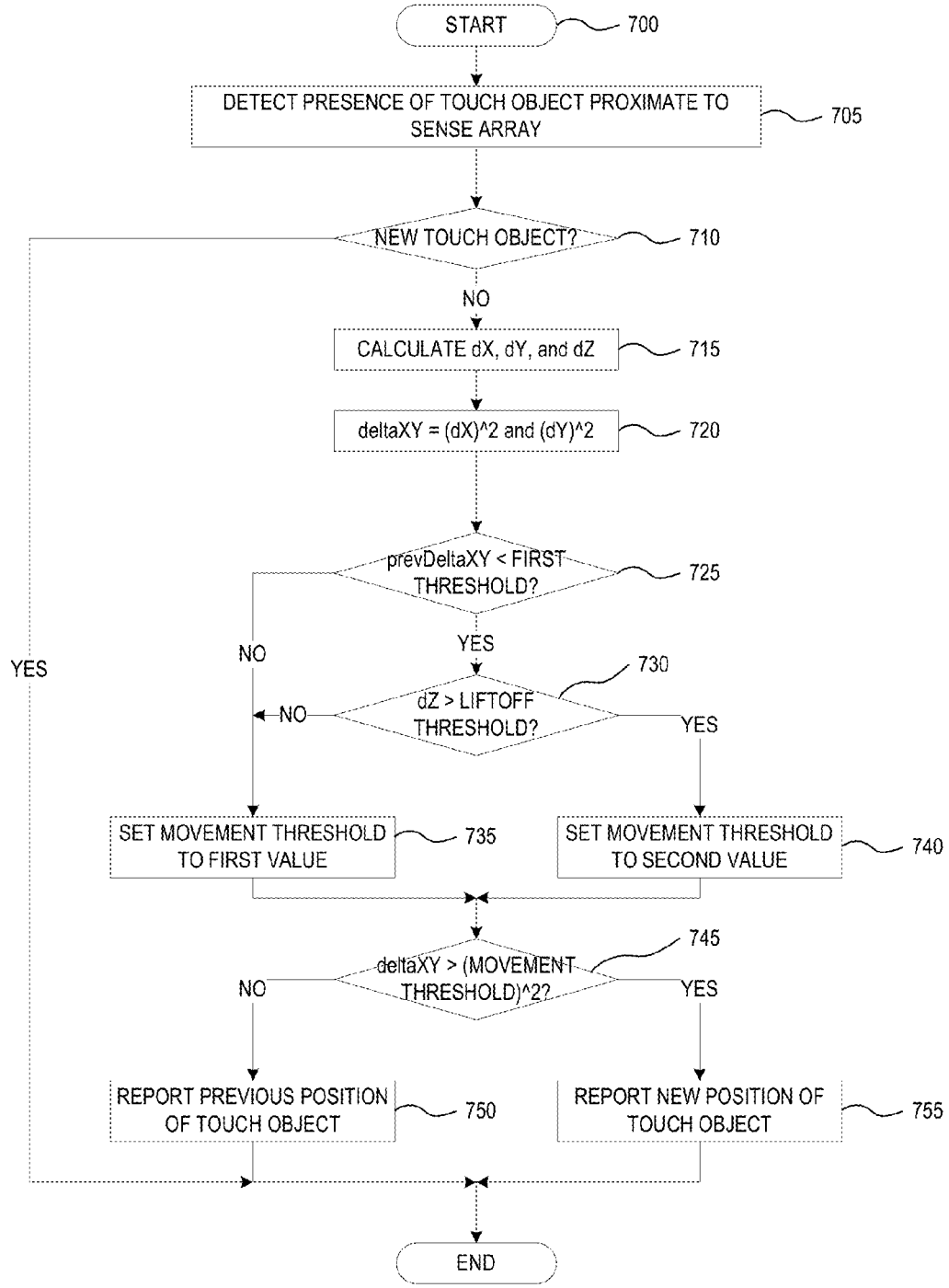
FIG. 7 is a flow chart of another embodiment of a method of detecting a liftoff of a touch object.

FIG. 7 is a flow chart of another embodiment of a method 700 of detecting a liftoff of a touch object. The method 700 may be performed by processing logic that may comprise hardware (circuitry, dedicated logic, gates, programmable logic, etc.), software (such as is run on a general purpose computing system or a dedicated machine), firmware (embedded software), or any combination thereof. In one embodiment, the processing device 110 illustrated in FIG. 1 may perform the method 700. Alternatively, other components of the electronic systems illustrated in FIGS. 1 and 2 may perform some or all of the operations of method 700.

Referring to FIG. 7, the method 700 begins at block 705 where the processing logic may detect the presence of a touch object (e.g., a finger) proximate to a sense array. At block 710, the processing logic determines whether the touch object is a new touch object. If the touch object is a new touch object (e.g., a touch object that was not previously detected), the method 700 ends because there may not previous positions, capacitance values, or touch areas that may be used to determine whether the presence of the touch object proximate to the sense array comprises a touchdown. If the touch object is not a new touch object, the processing logic calculates dX, dY, and dZ for the touch object at block 715. At block 720, the processing device calculates the value deltaXY for the current position of the touch, where deltaXY=(dX)^2+(dY)^2.

At block 725, the processing logic determines whether a previous deltaXY value, prevDeltaXY, is greater than a first threshold. prevDeltaXY may be calculated as follows by adding the square of a previous dX value (e.g., prevDX) with the square of a previous dY value (e.g., prevDY). If prevDeltaXY is not less than the first threshold, this may indicate that the touch object is likely moving and that the processing logic does not need to check whether a liftoff is occurring and the processing logic proceeds to block 735. If prevDeltaXY is less than the first threshold, the processing logic proceeds to block 730 where the processing logic determines whether dZ is greater than a liftoff threshold (e.g., a threshold change in capacitances or a threshold change in the size of the touch area). If dZ is not greater than the liftoff threshold, the processing logic proceeds to block 735 where the processing logic uses a first value for the movement threshold. In one embodiment, the first value may be a value that may be used by the processing logic to determine whether a touch object has moved if a liftoff has not occurred. If dZ is greater than the liftoff threshold, this may indicate that the presence of the touch object is a liftoff and the processing logic proceeds to block 740 where the processing logic sets the movement threshold to a second value. In one embodiment, the first value may be a value that may be used by the processing logic to determine whether a touch object has moved if a liftoff has occurred.

At block 745, the processing logic determines whether deltaXY is greater than the square of the movement threshold (which may be set to either the first value or the second value). If deltaXY is not greater than the square of the movement threshold, the processing logic proceeds to block 750 where the processing logic reports the previous position of the touch object. In one embodiment, the processing logic may refrain from reporting a position of the touch object instead of reporting the previous position of the touch object. After block 750, the method 700 ends. If deltaXY is greater than the square of the movement threshold, the processing logic proceeds to block 755 where the processing logic reports the new (e.g., current) position of the touch object. After block 755, the method 700 ends.

In one embodiment, the processing logic may perform the method 700 on each touch object that is detected. For example, a user may touch a touch screen with three fingers (e.g., three touch objects). The processing logic may perform the method 700 three times, once for each finger, to determine whether the finger is touching down onto the touch screen.

Figure 8:
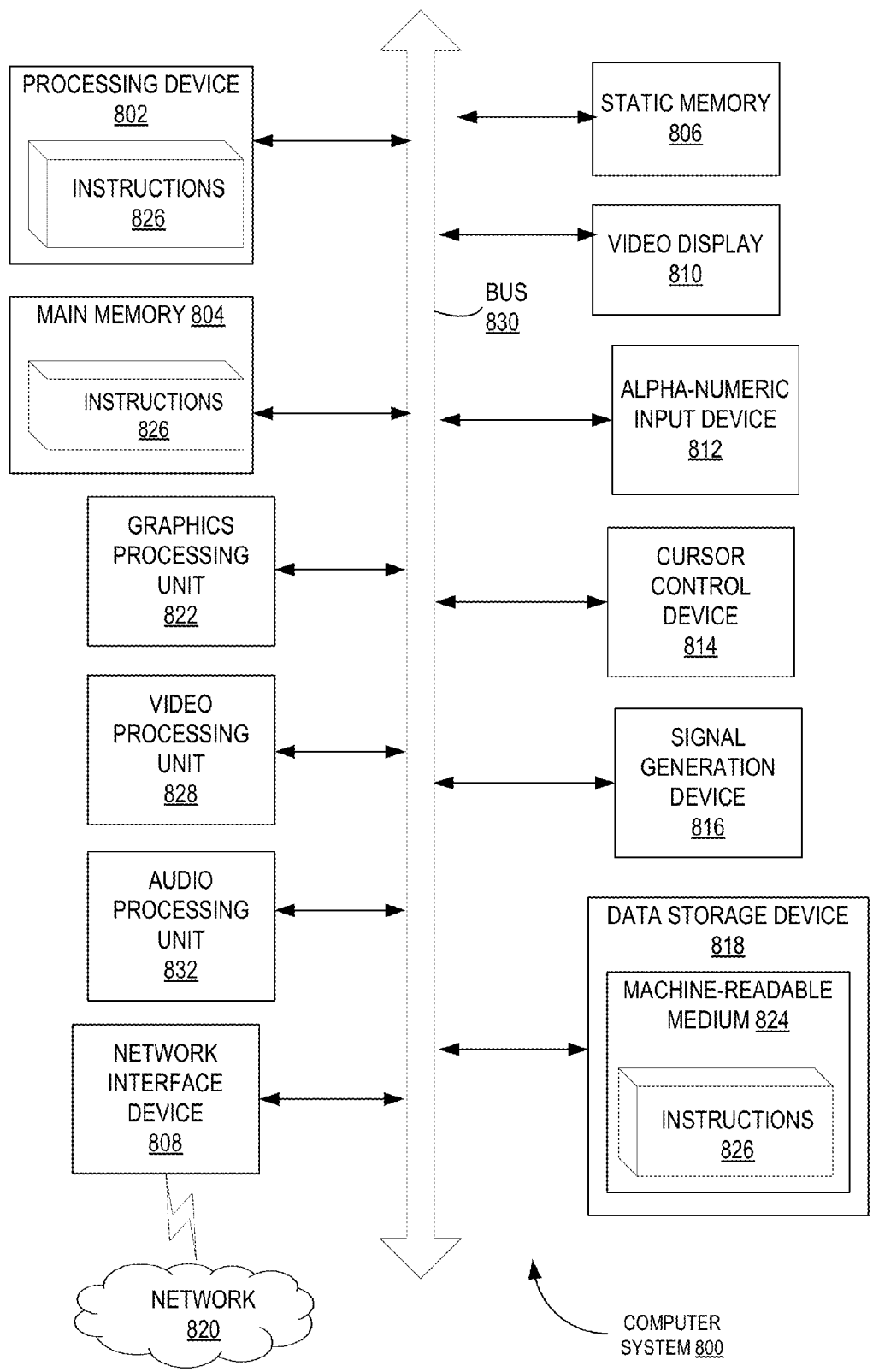
FIG. 8 is a block diagram of an example computing device that may perform one or more of the operations described herein.

FIG. 8 illustrates a diagrammatic representation of a machine in the example form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 800 includes a processing device 802, a main memory 804 (e.g., read-only memory (ROM), flash memory, dynamic random access memory (DRAM) (such as synchronous DRAM (SDRAM) or DRAM (RDRAM), etc.), a static memory 806 (e.g., flash memory, static random access memory (SRAM), etc.), and a data storage device 818, which communicate with each other via a bus 830.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. In one embodiment, processing device 802 may include one or processing cores. The processing device 802 is configured to execute the instructions 826 for performing the operations discussed herein.

The computer system 800 may further include a network interface device 808 communicably coupled to a network 820. The computer system 800 also may include a video display unit 810 (e.g., a touch screen, a liquid crystal display (LCD), or a cathode ray tube (CRT)), an alphanumeric input device 812 (e.g., a keyboard), a cursor control device 814 (e.g., a mouse), a signal generation device 816 (e.g., a speaker), or other peripheral devices. Furthermore, computer system 800 may include a graphics processing unit 822, a video processing unit 828, and an audio processing unit 832. In another embodiment, the computer system 800 may include a chipset (not illustrated), which refers to a group of integrated circuits, or chips, that are designed to work with the processing device 802 and controls communications between the processing device 802 and external devices. For example, the chipset may be a set of chips on a motherboard that links the processing device 802 to very high-speed devices, such as main memory 804 and graphic controllers, as well as linking the processing device 802 to lower-speed peripheral buses of peripherals, such as USB, PCI or ISA buses.

The data storage device 818 may include a computer-readable storage medium 824 on which is stored instructions 826 embodying any one or more of the methodologies of functions described herein. The instructions 826 may also reside, completely or at least partially, within the main memory 804 and/or within the processing device 802 during execution thereof by the computer system 800; the main memory 804 and the processing device 802 also constituting computer-readable storage media.

The computer-readable storage medium 824 may also be used to store instructions embodying any one or more of the methodologies of functions described herein. While the computer-readable storage medium 824 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

Embodiments of the present invention include various operations described herein. These operations may be performed by hardware components, software, firmware, or a combination thereof. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "determining," "refraining," "reporting," "storing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

The digital processing devices described herein may include one or more general-purpose processing devices such as a microprocessor or central processing unit, a controller, or the like. Alternatively, the digital processing device may include one or more special-purpose processing devices such as a digital signal processor (DSP), an application specific integrated circuit (ASIC), a field programmable gate array (FPGA), or the like. In an alternative embodiment, for example, the digital processing device may be a network processor having multiple processors including a core unit and multiple microengines. Additionally, the digital processing device may include any combination of general-purpose processing devices and special-purpose processing devices.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

Although the operations of the methods herein are shown and described in a particular order, the order of the operations of each method may be altered so that certain operations are omitted, so that certain operations are added, so that certain operations may be performed in an inverse order, or so that certain operations may be performed, at least in part, concurrently with other operations. In another embodiment, instructions or sub-operations of distinct operations may be in an intermittent and/or alternating manner.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. An apparatus comprising:
a sense array; and
a processing device, coupled to the sense array, the processing device to:
detect a presence of a touch object proximate to the sense array;
when the presence of the touch object comprises a touchdown of the touch object or a liftoff of the touch object, refrain from reporting a new position of the touch object when a change in the position of the touch object is less than a first movement threshold; and
when the presence of the touch object is not the touchdown of the touch object or the liftoff of the touch object, report the position of the touch object when the change in the position of the touch object is greater than a second movement threshold.

2. The apparatus of claim 1, wherein the processing device is further to:
report the position of the touch object when the change in the position of the touch object is greater than the first movement threshold and when the presence of the touch object comprises the touchdown of the touch object or the liftoff of the touch object.

3. The apparatus of claim 1, wherein the processing device is further to:
refrain from reporting the new position of the touch object when the change in the position of the touch object is less than the second movement threshold and when the presence of the touch object is not the touchdown of the touch object or the liftoff of the touch object.

4. The apparatus of claim 1, wherein the processing device is further to:
detect that an increase in capacitance values within a touch area is greater than a touchdown threshold; and
determine that the presence of the touch object comprises the touchdown of the touch object based on the increase in capacitance values.

5. The apparatus of claim 1, wherein the processing device is further to:
detect that a decrease in capacitance values within a touch area is greater than a liftoff threshold; and
determine that the presence of the touch object comprises the liftoff of the touch object based on the decrease in capacitance values.

6. The apparatus of claim 4, wherein the processing device is further to:
determine that the presence of the touch object comprises the touchdown of the touch object and the movement of the touch object; and
report the position of the touch object when the change in the position of the touch object is greater than the first movement threshold.

7. The apparatus of claim 5, wherein the processing device is further to:
determine that the presence of the touch object comprises the liftoff of the touch object and the movement of the touch object; and
report the position of the touch object when the change in the position of the touch object is greater than the first movement threshold.

8. The apparatus of claim 1, wherein the processing device is further to:
detect that an increase in a size of a touch area is greater than a touchdown threshold; and
determine that the presence of the touch object comprises the touchdown of the touch object based on the increase in the size of the touch area.

9. The apparatus of claim 1, wherein the processing device is further to:
detect that a decrease in a size of a touch area is greater than a touchdown threshold; and
determine that the presence of the touch object comprises the liftoff of the touch object based on the decrease in the size of the touch area.

10. The apparatus of claim 1, wherein refraining from reporting the new position of the touch object comprises:
refraining from reporting any position of the touch object;
storing new position of the touch object.

11. The apparatus of claim 1, wherein refraining from reporting the new position of the touch object comprises:
reporting a previous position of the touch object.

12. A method comprising:
detecting a presence of a touch object proximate to a sense array;
when the presence of the touch object comprises a touchdown of the touch object or a liftoff of the touch object, refraining from reporting a new position of the touch object when a change in the position of the touch object is less than a first movement threshold; and when the presence of the touch object is not the touchdown of the touch object or the liftoff of the touch object, reporting the position of the touch object when the change in the position of the touch object is greater than a second movement threshold.

13. The method of claim 12, further comprising:

reporting the position of the touch object when the change in the position of the touch object is greater than the first movement threshold and when the presence of the touch object comprises the touchdown of the touch object or the liftoff of the touch object.

14. The method of claim 12, further comprising:

refraining from reporting the new position of the touch object when the change in the position of the touch object is less than the second movement threshold and when the presence of the touch object is not the touchdown of the touch object or the liftoff of the touch object.

15. The method of claim 12, further comprising:

detecting that an increase in capacitance values within a touch area is greater than a touchdown threshold; and determining that the presence of the touch object comprises the touchdown of the touch object based on the increase in capacitance values.

16. The method of claim 12, further comprising:

detecting that a decrease in capacitance values within a touch area is greater than a liftoff threshold; and determining that the presence of the touch object comprises the liftoff of the touch object based on the decrease in capacitance values.

17. The method of claim 15, further comprising:

determining that the presence of the touch object comprises the touchdown of the touch object and the movement of the touch object; and reporting the position of the touch object when the change in the position of the touch object is greater than the first movement threshold.

18. The method of claim 16, further comprising:

determining that the presence of the touch object comprises the liftoff of the touch object and the movement of the touch object; and reporting the position of the touch object when the change in the position of the touch object is greater than the first movement threshold.

19. The method of claim 12, further comprising:

detecting that an increase in a size of a touch area is greater than a touchdown threshold; and determining that the presence of the touch object comprises the touchdown of the touch object based on the increase in the size of the touch area.

20. The method of claim 12, further comprising:

detecting that a decrease in a size of a touch area is greater than a touchdown threshold; and determining that the presence of the touch object comprises the liftoff of the touch object based on the decrease in the size of the touch area.

* * * * *